United States Patent
De Shon

(10) Patent No.: US 6,631,613 B1
(45) Date of Patent: Oct. 14, 2003

(54) BUOYANCY ENGINES FOR UTILIZATION OF EXCESS COMPRESSED GAS BY INDUSTRY

(76) Inventor: Denis Alan De Shon, 7242 Seven Oaks Ave., Baton Rouge, LA (US) 70806

( * ) Notice: Subject to any disclaimer, the term of this patent is extended or adjusted under 35 U.S.C. 154(b) by 0 days.

(21) Appl. No.: 09/604,216

(22) Filed: Jun. 27, 2000

(51) Int. Cl.[7] ............................................. F16D 31/02
(52) U.S. Cl. ...................................................... 60/398
(58) Field of Search ........................................... 60/398

(56) References Cited

U.S. PATENT DOCUMENTS 4,865,723 A * 9/1989 De Shon ..................... 210/104

\* cited by examiner

*Primary Examiner*—Edward K. Look
*Assistant Examiner*—Michael Leslie

(57) ABSTRACT

A Buoyancy Engine utilizing a gas collecting wheels disposed in a vessel filled with a liquid. Excess compressed air or gas from industrial processes is injected into the vessel and is directed into the gas holding spaces of the wheel. The gas imparts buoyant energy which is converted into rotational force as the gas ascends thru the apparatus, and the ring rotates. The ring is attached to a driveshaft mounted on bearings in the walls of the apparatus, and turns an electric generator a pump or other desired output.

1 Claim, 3 Drawing Sheets

BUOYANCY ENGINES FOR UTILIZATION OF EXCESS COMPRESSED GAS BY INDUSTRY

BACKGROUND OF THE INVENTION

1. Field of the Invention

Archimedes of Syracuse, in Archimedes Principle, stated that the Buoyant force on an object wholly or partially immersed in a fluid at rest is equal to the weight of the fluid displaced.

De Shon's Corollary to Archimedes Principle is that an engine may be constructed which utilizes the Buoyant Force to produce power through the ascent of gas within an engine. Basically a Buoyancy Engine is a corollary of a Gravity Engine.

A Gravity Engines Such as the Waterwheel Uses the Force of Gravity.

Water is captured in the vanes of the wheel.

Gravity drags the water down in the wheel, imparting rotation to the axle.

The force of rotation is dependent upon the volume of water introduced into the wheel.

Water weighs sixty-two pounds per cubic foot.

A Buoyancy Engine Uses the Force of Buoyancy.

Compressed gas is captured in the vanes of the wheel, displacing the water.

The buoyant force drags the air upward in the wheel, imparting rotation to the axle. The force of rotation is dependent upon the volume of the water which is displaced by the gas introduced into the wheel.

A cubic foot of gas displaces a cubic foot of water, which weighs sixty-two pounds, and provides that amount of Buoyant Lift.

This invention relates generally to buoyancy engines, and, more particularly, to ones which are disposed in liquid filled vessels, and are powered by excess compressed air or gas as a result of industrial processes. Buoyant gas is captured in the apparatus, which rotates a generator to convert the buoyant energy into electricity 2. Description of the Prior Art There have been various designs for buoyancy engines which show alternative approaches to capturing a gas in a liquid environment.

| Name | Patent No. |
| --- | --- |
| De Shon | 4,683,720 |
| De Shon | 4,713,937 |
| De Shon | 4,742,242 |
| De Shon | 4,865,723 |

But, none have addressed the employment of a buoyancy engines to provide cogeneration from the input of excess compressed gas from industrial processes.

SUMMARY OF THE INVENTION

The invention is a buoyancy engine, comprised of a plurality of gas holding spaces incorporated into a ring attached to a driveshaft which is supported on sealed bearings in the walls of a vessel which is filled with a liquid. Compressed air or other gases resulting from industrial processes is injected into the vessel and is introduced into the gas holding spaces at the 180 degree position of the ring. The gas holding spaces, filled sequentially with gas, ascend due to buoyant force, and impart a rotary motion to the driveshaft, which drives the electric generator attached to the other end of the driveshaft producing electricity. The gas holding spaces release the gas contained as they pass through the 360 degree positon. The ring and arms are sheathed with a hydrodynamically styled skin to reduce friction in the apparatus. All components are designed of materials resistant to heat and corrosion.

OBJECTS AND ADVANTAGES OF THE INVENTION

It is an object of the invention to provide stacked buoyancy engines of this character which capitalize on the buoyant power in gases produced as a by-product of industrial processes and which capturesthese gases in the gas holding spaces of a rotable ring to provide power to generate electricity by rotating an electric generator or other desired use, such as a pump. The gases, having done their work in the initial engine are directed into subsequent buoyancy engines mounted so as to multiply the total output of the system. Additionally, subsequent engines are sized so as to be able to capture the increasing volume of the gas as it ascends through the water.

It is another object of the invention to provide apparatus of this character that is simple in construction and operation.

It is a further object of the invention to provide apparatus of this character that is relatively inexpensive to manufacture and maintain.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate that employment of any structure, arrangements or modes of operation that are properly within the scope of the appended claims.

BRIEF DESCRIPTION OF THE DRAWINGS

Referring to the drawings, which are for illustrative purposes only.

DESCRIPTION OF THE PRESENT EMBODIMENT

Figure 1:
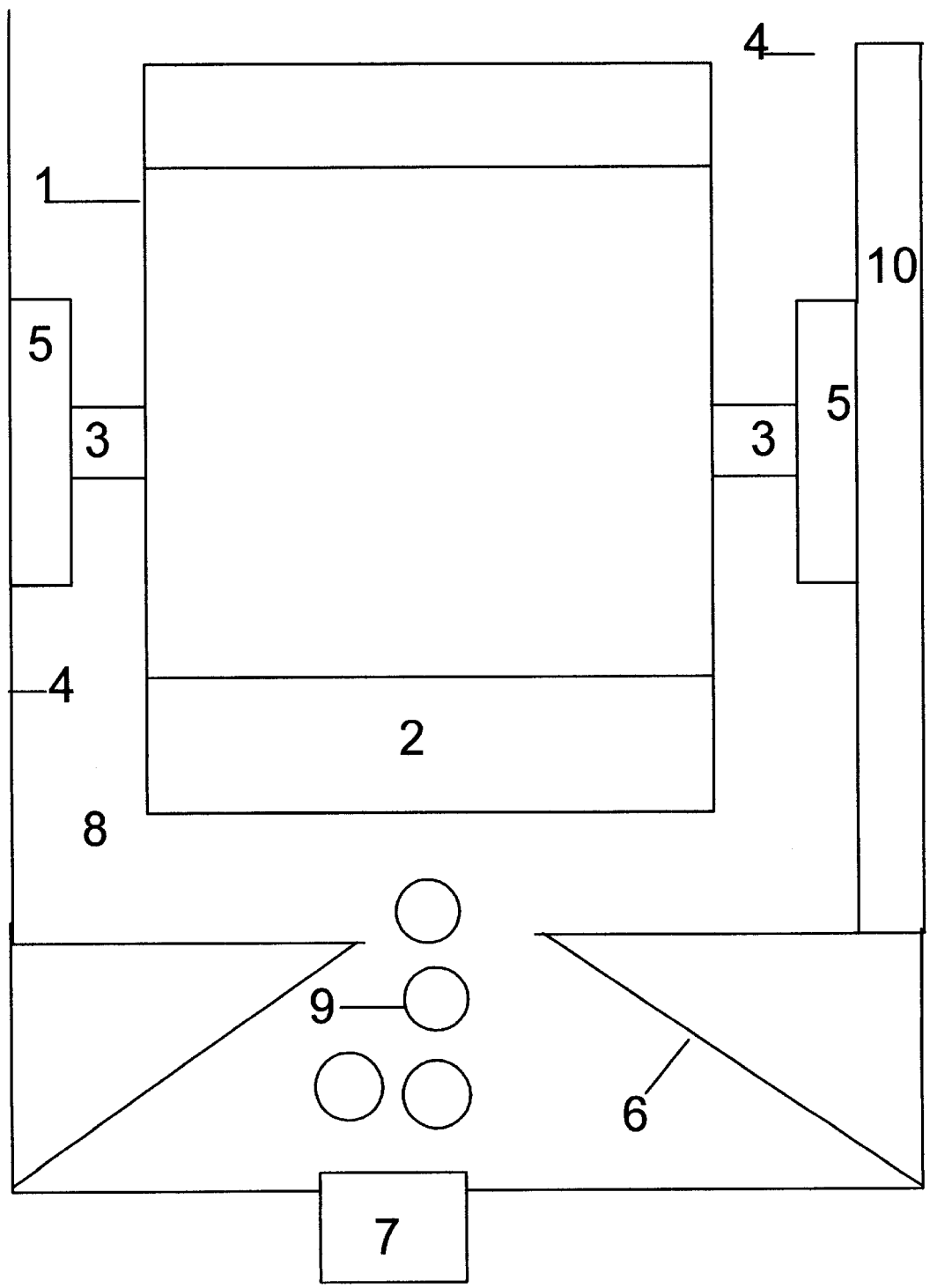
FIG. 1 is a schematic front view of the apparatus embodying the present invention, showing detail of the driveshaft, gas holding spaces, collector vessel walls and the electric generator FIG. 2. is a schematic side view of the apparatus embodying the present invention, showing the sealed bearings, driveshaft, the generator and the liquid in which it is immersed.

Referring to the drawings:

FIG. 1 is a schematic front view of the present Invention showing a ring (1), disposed in a vessel containing a liquid (11), containing gas holding spaces (2) is attached to a driveshaft (3) which is rotably mounted in the vessel walls (4) in sealed bearings (5). Below the ring is a collector (6) which is positioned above the compressed air injector (7). The gas (9) is directed into the apparatus at the 180 degree position of the ring. The buoyant force of the gas causes the ring (1) to rotate upward, imparting a rotational force to the driveshaft (3), which drives the generator (10). Gas, having expended its buoyant force within the apparatus, is discharged at the 360 degree point of the ring.

Figure 2:
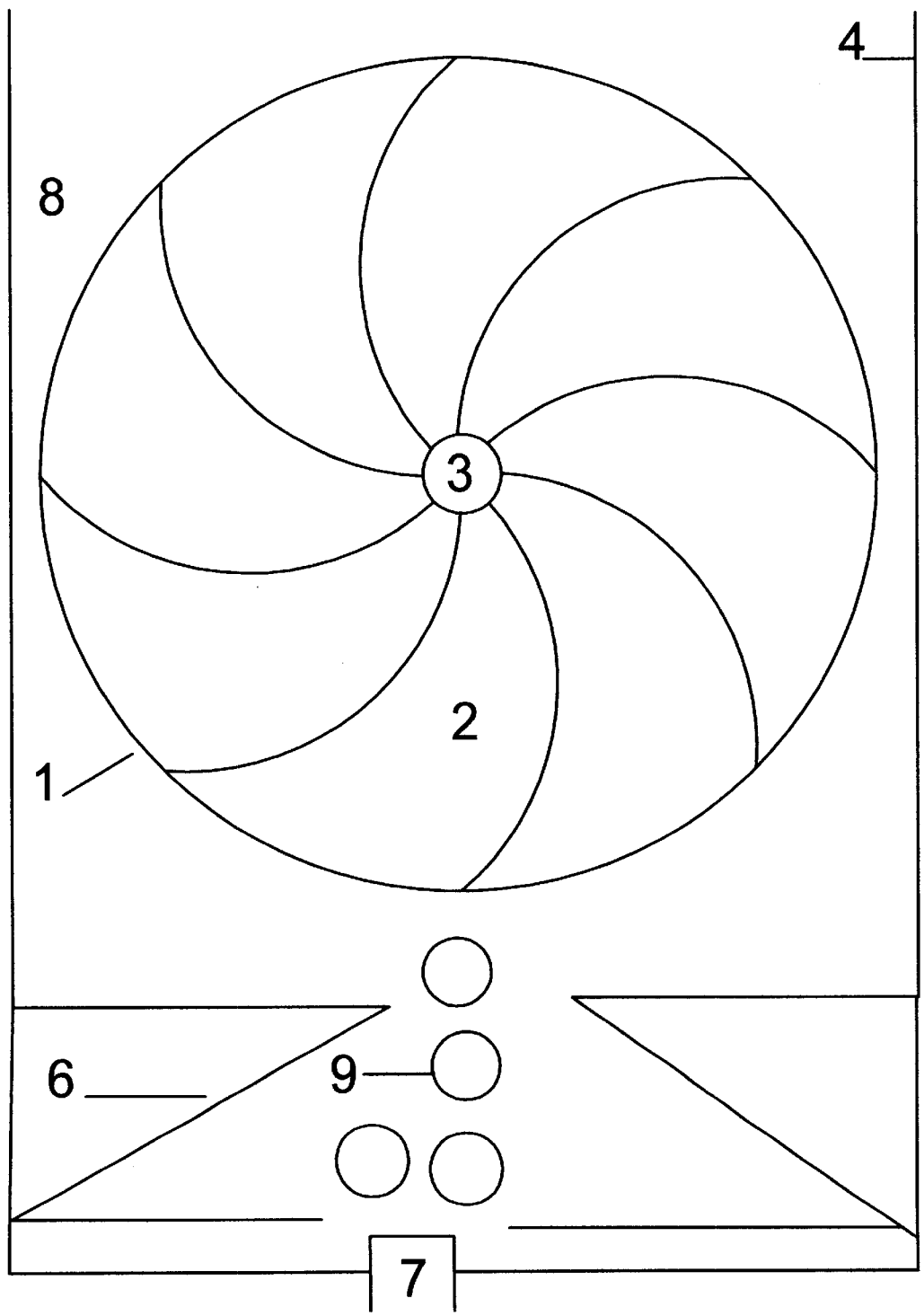

FIG. 2, is a schematic side view of the present invention, showing the liquid (11) in which the wheel (1) is disposed.

Figure 3:
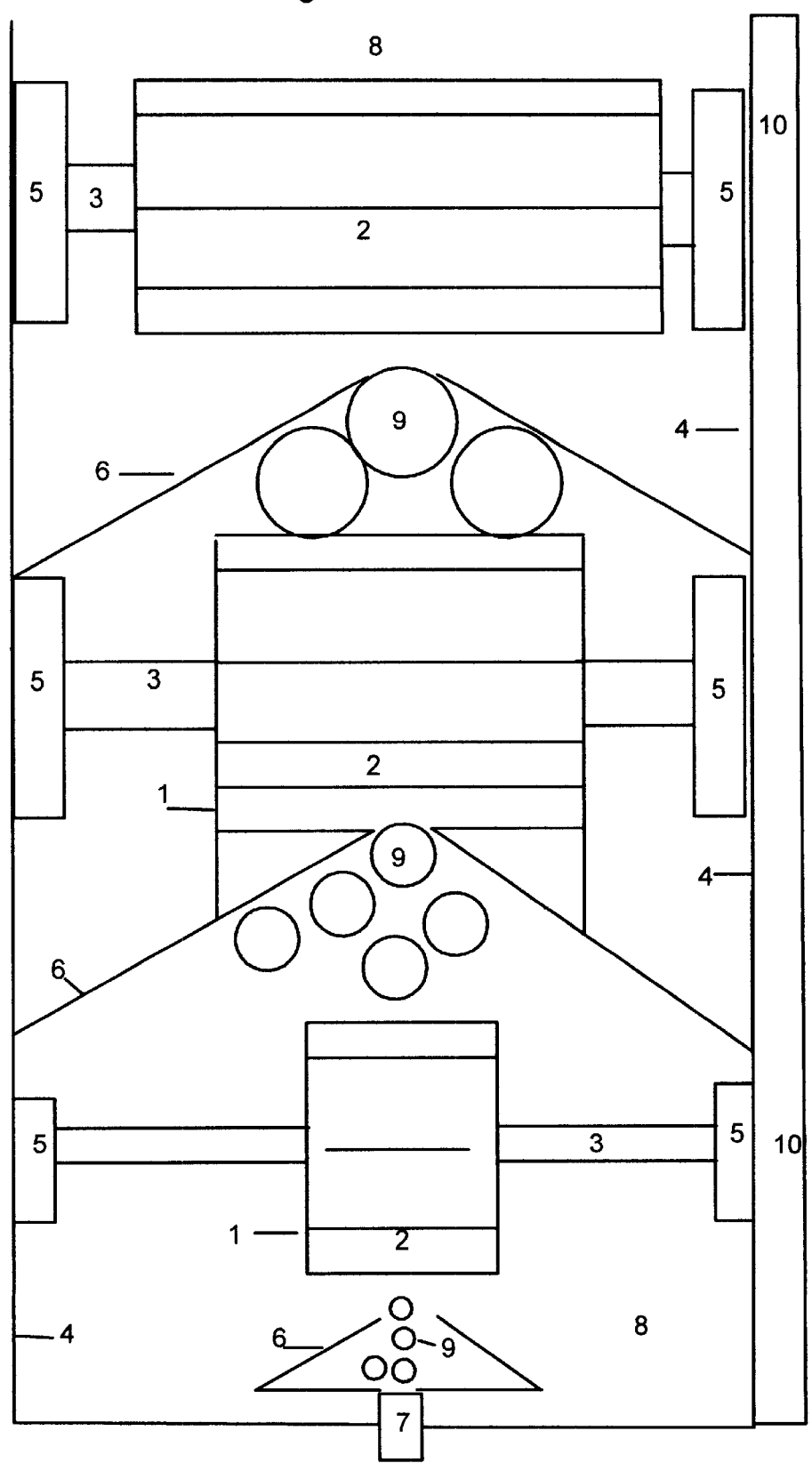
FIG. 3. is a schematic front view of the apparatus, and illustrates the additon of subsequent stacked wheels in a tall vessel, to re-use the air injected into the first wheel. as it ascends thru the vessel.

FIG. 3 is a view of a series of buoyancy engine wheels disposed in a tall vessel, which can be utilized if there is sufficient gas pressure, and which utilize the same gas injected into the first wheel, and each produces incrementally additional power from the same volume of injected gas. Gas injected at a pressure of 16 PSIG, will expand to twice its volume in its transit through a thirty foot deep vessel, and each subsequent wheel is driven by the originally injected gas and is sized to take advantage of this expansion. According to Boyles Law, "At a constant temperature, the volume of a gas varies inversely with pressure."

DESCRIPTION OF THE PRESENT EMBODIMENT (cont.)

One hundred cubic feet of gas injected at 15 PSIG at 33 feet below the surface of a liquid Doubles in volume to Two Hundred cubic feet, by the time it reaches the surface.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore being merely by way of example.

I, additionally, visualize this apparatus disposed in any liquid environment, and utilizing whatever pressurized gas is available.

I additionally visualize this apparatus disposed at the site of a petrochemical processing plant, which, as a result of operations issues a "Flare" to dispose of unwanted gases, and which gases are routed through the apparatus prior to being vented to the atmosphere.

I additionally visualize the use of a series of buoyancy engine wheels disposed in a sufficiently tall vessel so as to take advantage of the reusability of the injected gases.

I additionally visualize the use of "Gas Scrubbing" chemicals as the liquid in the vessel, so as to comply with EPA regulations.

I additionally visualize the use of liquids with a higher specific gravity than water in the apparatus, so as to take advantage of High pressure gases.

I do not wish to be restricted to the specific form shown or uses mentioned except as defined in the accompanying claims.

I claim:

1. A buoyancy engine with rings, disposed in a liquid environment within a vessel to capture the buoyant energy in compressed gases input into the vessel through an injector and routed through a collector to direct the gas into the initial wheel and into subsequent wheels, which wheels containing gas holding spaces, rotably mounted on a driveshaft, and which driveshaft is mounted in sealed bearings in the walls of the apparatus and, as a result of the conversion of buoyant force into rotable force, turns an electric generator or other desired machinery, such as a pump.

* * * * *